April 21, 1970 V. F. GORDEEV 3,507,568
FILMING EQUIPMENT

Filed July 13, 1967 2 Sheets-Sheet 1

United States Patent Office 3,507,568
Patented Apr. 21, 1970

3,507,568
FILMING EQUIPMENT
Valery Fedorovich Gordeev, Botanicheskaya ul. 1, kv. 61,
Moscow, U.S.S.R.
Filed July 13, 1967, Ser. No. 653,185
Int. Cl. G03b 23/02, 1/56
U.S. Cl. 352—72                                    4 Claims

ABSTRACT OF THE DISCLOSURE

A film cassette adapted for being inserted in a motion picture camera casing has a releasable mechanism which engages a clamping back frame to normally hold the frame in an advanced fixed position in which looped film over the back frame envelops the latter as a pattern for a film loop. When the cassette is inserted in the casing, a stop member in the casing engages the releasable mechanism to release the same and enable the back frame to occupy an operating position in which it cooperates with an immovable front frame on the casing to form a film channel.

---

The present invention relates to filming equipment and, more particularly, to motion picture cameras with a film channel formed by an immovable front frame secured in the camera casing and a clamping back frame placed in a cassette.

When loading the cassette with film, it is necessary to provide a certain length of film loop, while when setting the cassette in the camera, it is likewise necessary to properly distribute said loop in the intervals between the film channel and the drive sprocket.

In order to meet these requirements, the known cameras are equipped with loop-forming devices which provide a pattern determining the size of the film loop when loading the cassette and which are automatically withdrawn when setting the cassette in the camera. This pattern is set up either by flaps enveloping the film loops from the outside, or by levers disposed on the inside of the loop and limiting the size thereof.

Such loop-forming devices make the camera more complicated, since they comprise specially designed elements serving as the pattern for the film loop when loading the camera.

In accordance with the above, the present invention has for its object to develop a motion picture camera, simple of design and convenient in operation.

Therefore, a particular object of the invention is to provide a motion picture camera which can be conveniently and properly loaded with film without using any special elements serving as a pattern for the film loop.

In the accomplishment of this and other objects the back frame disposed in the camera cassette is itself used as a pattern, for which purpose, according to the invention, in the camera cassette there is mounted a releasable device normally retaining the back frame in the advanced fixed position, in which position said frame enveloped by the film serves as a pattern for the formation of a preset film loop, provision also being made for an element for releasing said device from the cooperation with the frame when setting the cassette in the camera casing. It is expedient that said device be fashioned as a spring-loaded pivotal lever normally thrust with its working end against the back frame for advancing the latter, and the lever is withdrawn from the frame, when setting the cassette in the camera casing, with the aid of the releasing element constituted as a stop mounted in the camera casing.

Figure 1:
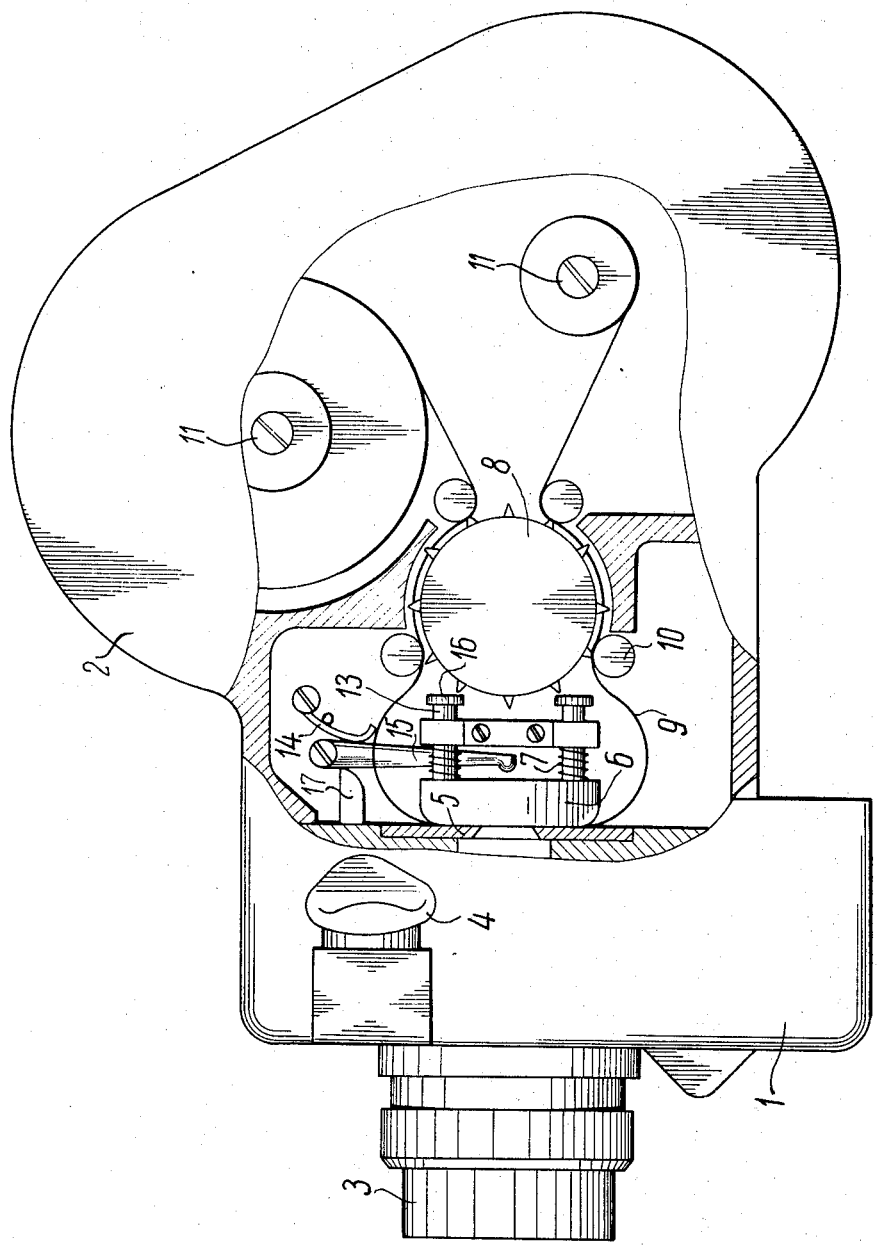
Figure 2:
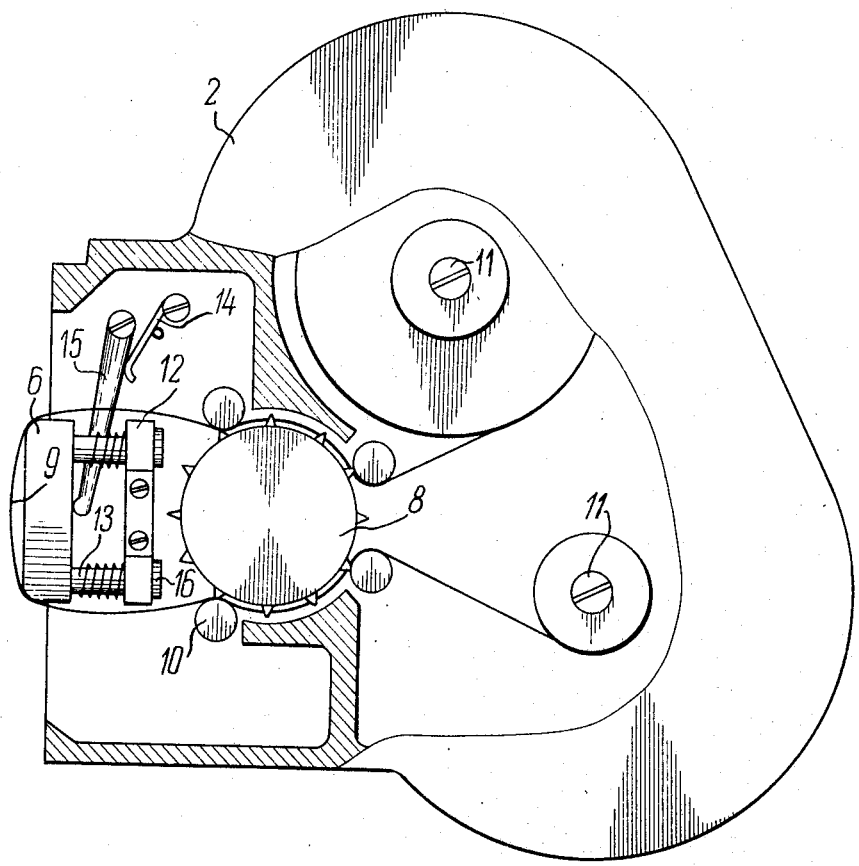

The details of the invention will become more apparent from the following detailed description of the embodiment thereof with reference to the accompanying drawing, wherein:

FIGURE 1 is a side view, partly broken away, schematically showing the camera, in which there is set a cassette with film; and FIGURE 2 shows the camera cassette loaded with film in side view and partly broken away.

A casing 1 (FIGS. 1 and 2) of the motion picture camera incorporating a cassette 2, a filming lens 3 and a view-finder 4, has a film channel made up by a front frame 5 secured in the camera casing 1 and a back frame 6 placed in the cassette 2 and effecting the clamping of film in the film channel under the action of springs 7.

Mounted in the cassette 2 is a sprocket 8 for conveying film 9 which is kept on the sprocket 8 with the aid of rollers 10 and axles 11 of take-up and delivery bobbins.

The back frame 6 is held on a bracket 12 with the aid of guiding pins 13 rigidly secured on the frame 6.

Under the action of a spring 14, a turnable lever 15 disposed in the cassette 2 holds with its working end the frame 6 in the advanced position limited by stops 16 of the pins 13.

In this position there takes place the loading of the cassette with film, and the frame 6 enveloped by film 9 serves as a pattern for the formation of a preset film loop.

When setting the cassette 2 in the camera casing 1, the lever 15 is thrust against a stop 17 disposed in the camera casing 1 and is withdrawn from the frame 6, the latter effecting the clamping of the film against the front frame 5 with the aid of the springs 7.

The motion picture camera according to the present invention is simple in design, convenient in maintenance and reliable in operation, since, when setting the cassette in the camera, the film is clamped in the film channel between the front and the back frames before the lever is released from the cooperation with the back frame, which fact does not let the film loop shift in any direction and insures the uniform distribution of the film loop above and below the film channel.

I claim:

1. In a motion picture camera, having a film channel formed by an immovable front frame secured in the camera casing and a clamping back frame mounted in a cassette: a releasable mechanism mounted in said cassette and normally retaining said back frame in an advanced fixed position, means in said cassette for looping the film over the back frame such that in said advanced position, said back frame serves as a pattern for the formation of a present film loop, and means on said casing for releasing said mechanism from the cooperation with the back frame when said cassette is placed in the camera casing.

2. A motion picture camera in accordance with claim 1 wherein said releasable mechanism comprises a spring-loaded pivotal lever normally thrust against said back frame for urging the latter to said advanced position, said means for releasing said mechanism comprising a stop mounted in the camera casing to engage and withdraw said lever from the frame when the cassette is set in the camera casing.

3. A motion picture camera in accordance with claim 2 wherein said clamping back frame comprises a frame member, a fixed bracket in said casing, and means on said frame member slidably mounted in said bracket to enable the frame member to move between said advanced position and a retracted, operating position.

4. A motion picture camera in accordance with claim 3 wherein said means on said frame member comprises pins, and springs mounted on said pins for contact with the frame member when the latter is in retracted position.

References Cited
UNITED STATES PATENTS

| | | | |
|---|---|---|---|
| 3,089,629 | 5/1963 | Sakaki | 352—159 XR |
| 3,201,798 | 8/1965 | Mayer et al. | 352—159 |
| 3,243,251 | 3/1966 | Wessner | 352—72 XR |
| 3,281,199 | 10/1966 | Kingston | 352—72 |

FOREIGN PATENTS 1,354,994  2/1964  France.

NORTON ANSHER, Primary Examiner
D. S. STALLARD, Assistant Examiner

U.S. Cl. X.R.

352—159